United States Patent Office 3,091,644
Patented May 28, 1963

3,091,644
ALDEHYDE SYNTHESIS
Clyde Lee Aldridge, Baton Rouge, La., assignor to Esso Research and Engineering Company, a corporation of Delaware
No Drawing. Filed Aug. 21, 1958, Ser. No. 756,306
2 Claims. (Cl. 260—604)

This invention relates to an improved process for the production of oxygenated organic compounds employing novel oxonation modifiers. More particularly, this invention relates to the use of minor amounts of modifiers to increase the selectivity to the aldehyde in an oxonation reaction. Another phase of this invention relates to the use of small amounts of these modifiers to materially increase conversion in the oxo process.

The prior art is well aware of the general process for the production of aldehydes from olefinic compounds via the oxo route. In the oxo process an olefinic compound is reacted with carbon monoxide and hydrogen at elevated temperatures and pressures in the presence of a cobalt catalyst to produce a crude aldehyde product mixture wherein the aldehydes contain one more carbon atom than the olefinic feed. While other higher and lower molecular weight compounds are formed in this process, the principal product is the aldehyde which, if desired, may be subsequently converted to the corresponding alcohol. In general, the oxo reaction employs as feed any olefinic compound having from 2 to about 20 carbon atoms per molecule. The olefinic compound may have the double bond situated in a terminal or internal position within the molecule. Also the feed may contain other functional groups such as hydroxy, carboxy and the like, e.g. unsaturated acids and alcohols. In any feed the carbonyl group will add on to one of the olefinic carbon atoms, saturating the double bond. Commercially there have been employed olefins of up to 13 carbon atoms per molecule, e.g. pentene, hexene, heptene, decene, and tridecene as feed stocks for the preparation of the alcohol having one more carbon atom than the feed stock; however, this invention is applicable to any oxo process regardless of feed employed.

The cobalt catalyst employed may be in any form including its elemental state or as a compound. Typical cobalt compounds which have been suggested for this reaction include cobalt oleate, stearate, naphthenate, linoleate, acetate, butyrate, oxide, nitrate, chloride and the like. The catalyst is added to the liquid reaction mixture in an amount from 0.01 to 0.2 mole of cobalt per liter of olefinic feed. Pressures employable for this reaction range between 1000 and 6000 p.s.i.g., although higher pressures have been utilized with success. Temperatures employable range from about 90–260° C. depending on the particular olefinic feed employed and the desired end product. It has, for example, been noted that the use of lower temperatures favor the production of straight chain product which in many cases is desirable. The oxo process may be carried out in a batch, semicontinuous or continuous manner as desired. In most commercial units in the United States the process is on a continuous basis. The hydrogen to carbon monoxide ratios employed may vary from 1 to 4 to 4 to 1; however, conventional synthesis gas with a ratio of about 1 to 1 is convenient and satisfactory for the process.

While in many cases it is desirable to produce an alcohol by hydrogenating the oxo aldehyde product mixture, in some cases it is desirable to produce the aldehyde in a purified state for sale as such or for the purpose of converting these aldehydes by oxidation to the corresponding acids or other derivatives. Also in the normal course of the oxo reaction, the first stage crude oxo product will contain appreciable amounts of alcohol along with the primary aldehyde product. This alcohol results from a reduction of the monomer aldehyde in the carbonylation stage. In a commercial plant the alcohol present after the oxonation stage may be, for example, as high as 55 to 60% of the combined monomer product. This high production of alcohol in the initial stage significantly decreases the yield of oxo aldehyde product obtainable from the reaction, due to an interaction between the aldehyde and alcohol at elevated temperatures. The presence of alcohols in the product from the initial oxo stage effects the production of unwanted higher boiling impurities such as the acetals. While these higher boiling impurities may be cracked to obtain a good product, this procedure adds considerably to the cost of the process. It is evident, therefore, that the control of the ratio of aldehyde to alcohol in the oxo stage is of paramount importance. For a more complete description of the oxo process, reference may be had to the book entitled "Higher Oxo Alcohols," by Dr. Lewis F. Hatch and published by Enjay Co., Inc., New York, N.Y.

It has now been discovered that in the oxo reaction, if carried out under conventional conditions but with the addition of very small percentages of certain metals, hydrogenation in the oxo stage can be substantially minimized and the aldehyde to alcohol ratio accordingly increased markedly.

It has also been discovered that these modifiers not only aid in the control of the aldehyde to alcohol ratio but, when employed in certain amounts, markedly increase oxo conversion. The reaction modifiers of this invention comprise compounds containing a metal from the sixth period of periodic chart, having an atomic number between 79 and 83 inclusive and having a position in the electromotive series below cobalt. While these metal modifiers may be employed in their elemental state, for a more accurate control of their concentration and distribution in the reaction mixture, it is preferable to use them in the form of a salt or compound and more preferably in the form of a compound which is soluble in the olefinic feed. The metals having an atomic number between 79 and 83 and which are below cobalt in the electromotive series are gold, mercury, lead and bismuth and may be added as the naphthenate or the salt of a fatty acid such as the oleate, stearate, linoleate, acetate, butyrate or other salt of an organic acid. Alternatively, they may be added as inorganic salts such as chlorides, nitrates, oxides, carbonates and the like. The modifier may be added separately to the reaction zone or in combination with the cobalt containing catalyst either with the olefinic feed, diluent if employed or as a catalyst concentrate. While this invention comprises the use of the aforesaid metal containing modifiers and the conventional cobalt catalyst, it is to be understood that other modifiers which may affect yield, selectivity, dimerization, etc. may also be employed for their known functions.

The modifier of this invention must be employed within a range of from about 0.1 millimole to about 5 millimoles per liter of olefinic feed. To obtain high oxo conversions, it is preferable to employ the modifier within the range of about 0.1 to about 1 millimole of modifier per liter of olefinic feed. To obtain high ratios of aldehyde to alcohol, it is preferable to employ the modifier within the range from about 1 to 5 millimoles of activator per liter of olefinic feed. Example 1 shows a conventional batch oxonation process and may be compared with the modified oxo process of this invention under identical conditions with exception of the modifier as shown in Example 2.

EXAMPLE 1

1 liter of heptene ($C_7$ cut from U.O.P. polymerization) was charged to a 3 liter bomb with 0.020 mole of cobalt oleate. The bomb was then pressured with 1500 p.s.i.g. of $H_2$/CO at 1.1/1.5 and heated to 177° C. after which the pressure was raised to 3000 p.s.i.g. The reaction temperature was maintained at about 177° C. for 6 hours and the synthesis gas pressure replenished as needed. The bomb was then cooled to 35° C. and the remaining gas flushed out with methanized hydrogen. Cobalt carbonyl compounds were then decomposed by pressuring to 200 p.s.i.g. with hydrogen and heating at 177° C. for one hour. After cooling, the conversion and selectivities were determined by distillation of the product in a 30 plate Oldershaw column. In this run the oxo conversion was 80.7% with about 0.6% olefin recovered in the hydrocarbon phase.

EXAMPLE 2

The same olefin was oxonated under identical conditions employing in addition approximately 0.45 millimole of lead stearate. The oxo conversion determined by distillation, as in the example above, was 86.0% representing a very substantial increase in conversion of about 6.5%. It is to be pointed out that an increase in conversion at this level of only a few percent is sufficient to materially affect the economics of a commercial process.

To show the very substantial increase in the ratio of aldehyde to alcohol obtainable with the present activators, reference may be had to Examples 3 and 4. Example 3 was carried out under conventional conditions without a modifier and Example 4 was carried out under the same conditions in the presence of a modifier.

EXAMPLE 3

The procedure and conditions of Example 1 was repeated employing 1 liter of the olefin, 0.020 mole of cobalt at 177° C. and pressure of 3000 p.s.i.g. Conversion was comparable to that in Example 1, i.e. about 81%. Analysis by distillation showed a selectivity of 2.9 mole percent to the $C_8$ aldehyde and a selectivity of 71.5% to the $C_8$ alcohol. This is an exceptionally low ratio of aldehyde to alcohol which resulted from the severe conditions employed. Nevertheless, even under milder conditions in a continuous operation, the selectivity to aldehyde in the oxo stage is seldom greater than 55–60%.

EXAMPLE 4

The procedure of Example 3 was followed exactly employing 2 millimoles of lead stearate per liter of olefin under the same operating conditions. The conversion in this example was approximately the same as in Example 3, i.e. 81%; however, the selectivity to $C_8$ aldehyde in mole percent rose to 44.2 with a corresponding selectivity to alcohol of 20.9 mole percent.

It is evident from Examples 3 and 4 that the employment of the modifier of this invention within the ranges stated significantly increases the selectivity to the $C_8$ aldehyde by minimizing hydrogenation of the aldehyde to alcohol in the oxo product. To demonstrate the advantages of the particular modifiers employed over other metal compounds, reference may be had to Table I which follows:

*Table I*

[$C_7$ U.O.P. olefin, .020 mole per liter Co oleate, .004 mole per liter of additive, 6 hr. run, 177° C., 3000 p.s.i.g., 1.3/1 $H_2$/CO]

| Run No. | Additive | Selectivity, Mole percent | | $C_8$ Aldehyde Yield, Mole Percent |
|---|---|---|---|---|
| | | $C_8$ Aldehyde | $C_8$ Alcohol | |
| 5822 | None | 4.1 | 74.0 | 3.1 |
| 5530 | Bismuth Oleate [1] | 43.3 | 26.3 | 32.6 |
| 5536 | Mercuric Stearate | 27.8 | 40.8 | 19.5 |
| 5803 | Lead Stearate | 45.7 | 9.4 | 33.0 |
| 5810 | Sodium Methoxide | 2.0 | 66.1 | 1.6 |
| 5814 | Lithium Stearate | 4.9 | 59.9 | 4.0 |
| 5818 | Cadmium Stearate | 1.9 | 66.2 | 1.5 |
| 5840 | Thallic Stearate | 7.9 | 67.0 | 6.2 |
| 5844 | Potassium Oleate | 4.6 | 70.1 | 3.7 |
| 5848 | Ferrous Stearate | 4.5 | 67.3 | 3.4 |

[1] .0018 m./l.

From Table I it will be noted that lead is most effective for increasing the selectivity to aldehyde, bismuth next and mercury next. The remaining metals in the table have substantially no effect on the selectivity to the aldehyde and the aldehyde yield.

To demonstrate the effectiveness of the modifiers in a continuous system, a $C_7$ olefin was employed with the flow rates, conditions and results as shown in Table II.

*Table II*

[Continuous unit runs in TBS unit $C_7$ U.O.P. olefin feed, 3000 p.s.i.g., 1.3/1 $H_2$CO, 177° C.]

| Run No. | Catalyst, millimoles per liter | | Feed Rate, v./v./hr. | Product Distribution, Vol. Percent | | | | Ratio $C_8$ Aldehyde/ $C_8$ Alcohol |
|---|---|---|---|---|---|---|---|---|
| | Co Oleate | Pb Stearate | | Hydrocarbon | $C_8$ Aldehyde | $C_8$ Alcohol | Bottoms | |
| 78A-4 | 18 | None | .26 | 18 | 36 | 28 | 18 | 1.28 |
| 78A-5 | 17 | None | .28 | 20 | 39 | 26 | 15 | 1.50 |
| 83A-1 | 21 | 1.9 | .24 | 19 | 46 | 22 | 13 | 2.09 |
| 84A-1 | 19 | 3.4 | .26 | 21 | 45 | 21 | 13 | 2.14 |

In the continuous process the lead modifier not only significantly increased the ratio of aldehyde to alcohol but reduced the bottoms product by a measurable degree.

To demonstrate the criticality with regard to the concentration of the modifier, reference is had to Table III. The runs in this table were all carried out under the same operating conditions as specified in Example 1.

*Table III*

| Run No. | Lead Concentration, mole/liter | Oxo Conversion, Mole Percent | Selectivity, $C_8$ Aldehyde | Mole Percent $C_8$ Alcohol | $C_8$ Aldehyde Yield, Mole Percent |
|---|---|---|---|---|---|
| 5792 | | | | | |
| 5794 | 0.0000 | 81.4 | 2.9 | 71.5 | 2.4 |
| 5798 | | | | | |
| 5799 | 0.0004 | 84.6 | 4.6 | 65.2 | 3.9 |
| 5801 | 0.0005 | 86.0 | 3.4 | 67.4 | 2.9 |
| 5806 | 0.002 | 81.0 | 44.2 | 20.9 | 35.8 |
| 5803 | 0.004 | 72.1 | 45.7 | 9.4 | 33.0 |
| 5804 | 0.005 | 70.2 | 28.9 | 6.0 | 20.3 |

From Table III it is noted that the oxo conversion is maximized with lead concentrations below about 1 millimole per liter of olefin feed. At these low concentrations there is very little effect on the selectivity to $C_8$ aldehyde and yield of $C_8$ aldehyde. Only minor increases in selectivity and yield are noted for this range. At concentrations of from 1 to 5 millimoles of lead per liter of olefin, the selectivity to aldehyde is maximum; however, as the concentration is increased to the upper portion of this range, a decrease in conversion is obtained with lesser improvements in the selectivity of aldehyde. Preferably in accordance with this invention, the lead concentration for maximum selectivity to aldehyde will be maintained between about 1 and 4 millimoles of lead per liter of olefin and no greater than 5 millimoles per liter.

What is claimed is:

1. In a process for converting an olefinic compound having $n$ carbon atoms, $n$ being an integer from 2 to 20, to a mixture comprising aldehydes having $n+1$ carbon atoms wherein said olefinic compound is reacted in the liquid state with carbon monoxide and hydrogen at elevated temperatures and pressures in the presence of about 0.01 to 0.2 mole of a cobalt oxo catalyst per liter of olefinic compound the improvement which comprises reacting said olefinic compound with carbon monoxide and hydrogen in the presence of about 0.1 to about 5 millimoles per liter of olefin of a modifier comprising an olefin soluble mercury salt of an organic acid.

2. In a process for the production of oxygenated compounds wherein an olefin of 2 to 20 carbon atoms is reacted with carbon monoxide and hydrogen employing a carbon monoxide/hydrogen ratio between 1/4 and 4/1, at temperatures between about 90° and 260° C. and pressures between about 1,000 and 6,000 p.s.i.g., in the presence of about 0.01 to 0.2 mole per liter of olefin of a cobalt catalyst to produce a mixture containing aldehydes and alcohols having one more carbon atom per molecule than said olefin, the improvement which comprises carrying out said process in the presence of a modifier comprising an olefin soluble salt of mercury and an acid selected from the group consisting of naphthenic acid and fatty acids, said modifier being present in an amount equal to about 1 to 5 millimoles of said metal per liter of olefin.

References Cited in the file of this patent

UNITED STATES PATENTS

| | | |
|---|---|---|
| 2,811,567 | Mason | Oct. 29, 1957 |
| 2,949,486 | Weesner et al. | Aug. 16, 1960 |

OTHER REFERENCES

Oxo Process, patent applications of the I. G. Farbenindustrie Aktiengesellschaft T. O. M. Reel 36 (1946) pages 23–27.